2 Sheets--Sheet 1.

W. H. St. JOHN & S. O. ROCKWELL.

Purifying Illuminating-Gas.

No. 5,777 Reissued March 3, 1874.

Witnesses:
Benj. Wakeman
Thos. E. Cuff

Inventor:
Wm. H. St. John
S. O. Rockwell

W. H. St. JOHN & S. O. ROCKWELL.

Purifying Illuminating-Gas.

No. 5,777 Reissued March 3, 1874.

Witnesses:
Benj. Wakeman
Thos. E. Cliff

Inventor:
Wm. H. St. John
S. O. Rockwell

UNITED STATES PATENT OFFICE.

WILLIAM H. ST. JOHN, OF NEW YORK, N. Y., AND SAMUEL O. ROCKWELL, OF JERSEY CITY, NEW JERSEY, ASSIGNORS, BY MESNE ASSIGNMENTS, OF PART INTEREST TO THE ST. JOHN AND ROCKWELL COMPANY.

IMPROVEMENT IN PURIFYING ILLUMINATING-GAS.

Specification forming part of Letters Patent No. 113,463, dated April 4, 1871; reissue No. 5,777, dated March 3, 1874; application filed February 24, 1874.

*To all whom it may concern:*

Be it known that we, WILLIAM H. ST. JOHN, formerly of Brooklyn, in the county of Kings and State of New York, but now of the city of New York, N. Y., and SAMUEL O. ROCKWELL, of Jersey City, in the county of Hudson and State of New Jersey, have invented certain Improvements in Friction-Condensers for Illuminating-Gas, of which the following is a specification:

This invention relates to the elimination from illuminating-gas of the tarry and other impurities contained therein as it passes from the retorts. The invention consists in a hydraulic seal, so combined with a suitable condenser, and so arranged for action upon the volume of gas entering the apparatus, that the said seal will, in a great measure, precipitate the tar, &c., from the gas. The invention also consists in the arrangement, within the condenser, of corrugated plates, by frictional contact with which the gas is purified from a further proportion of the tar. The invention also comprises the combination, with the condenser, of an adjustable lattice-work; and, also, the combination, with the pipes forming the shell of the said condenser, of corrugated covers, whereby the frictional action upon the gas is assisted or supplemented, and the purification of the latter is still further promoted.

Figure 1:
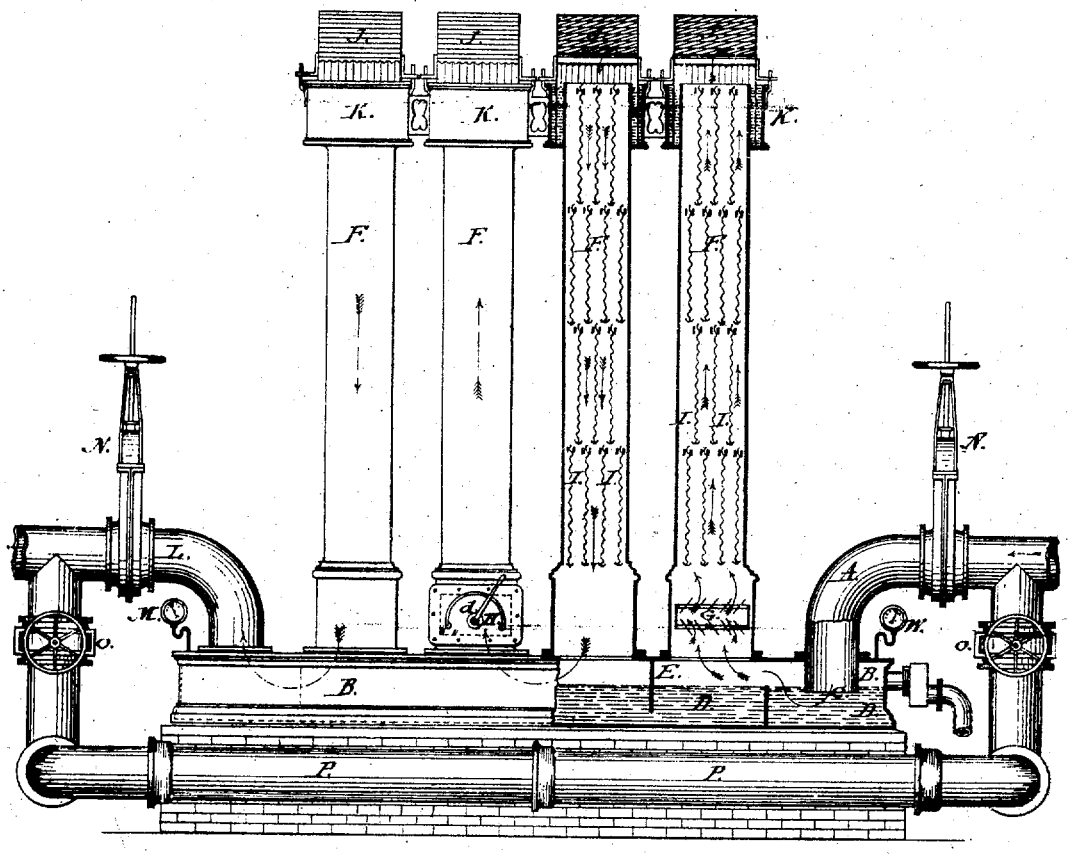
Figure 3:
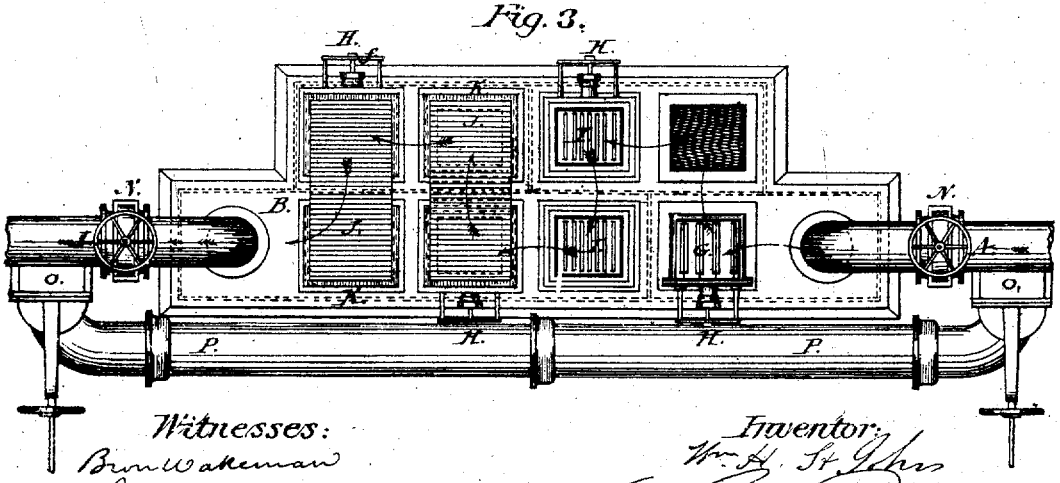
Figure 2:
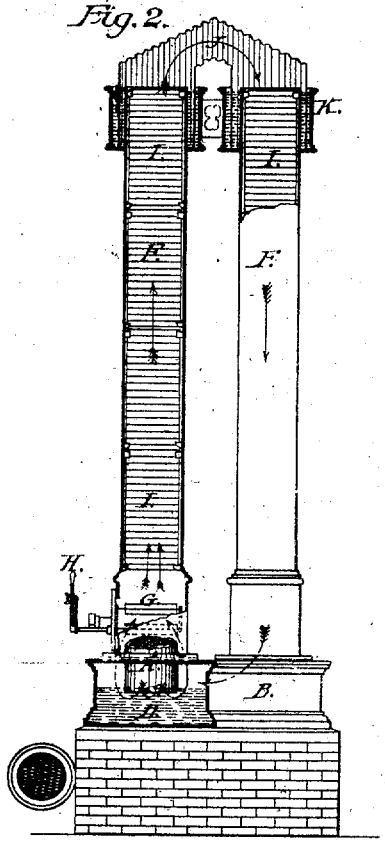
Figure 4:
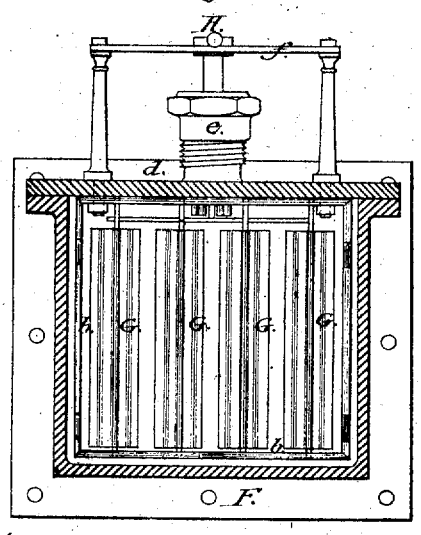
Figure 6:
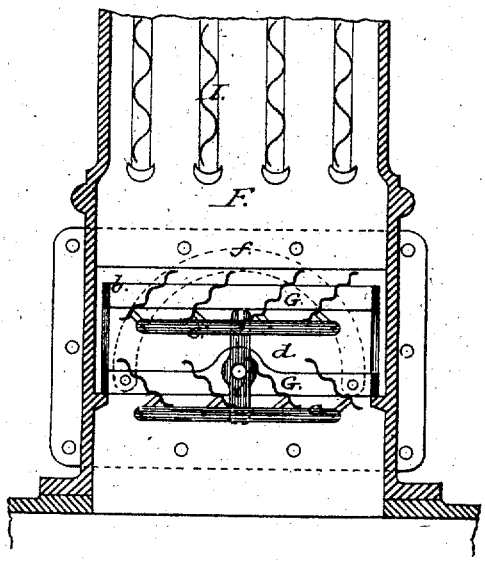
Figure 5:
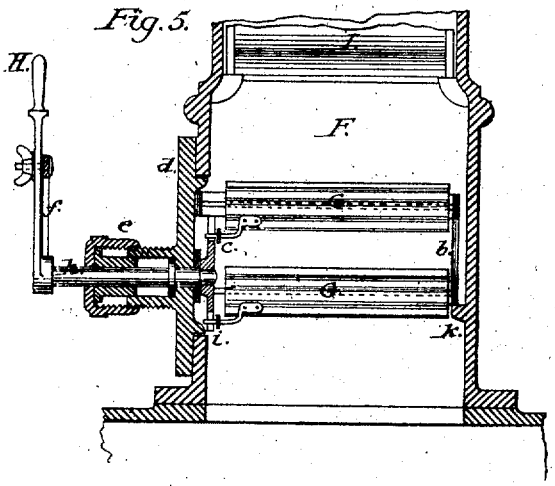

Figure 1 is a front elevation of an apparatus constructed according to our invention. Fig. 2 is an end elevation of the same. Fig. 3 is a plan view of the same. Fig. 4 is a horizontal sectional view, on an enlarged scale, of the same, taken in a plane above the lattice-work; of which Fig. 5 is a side, and Fig. 6 a rear, view.

In the operation of the apparatus, the gas, after leaving the hydraulic main, is conducted, by an ordinary pipe, A, (shown in Fig. 1,) to the condenser, where it enters the compartment B at one end of the tar-well D, and is conducted down to the hydraulic seal C to any required depth, which gives to the gas its first friction on entering the condenser. The gas, being forced through the seal by the usual exhauster, passes into the adjacent compartment B, and from this, through the space above the tar-well D, passes in the direction indicated by the arrows until its course is changed by coming in contact with the vertical plate E, the lower edge of which is sealed in the tar-well, as will be understood by reference to Fig. 1. The gas thus directed rises in the contiguous one of the vertical pipes F, and, so doing, passes between the corrugated surfaces of lattice-work G, and is subjected to frictional action thereby. The arrangement of this lattice-work is shown more fully in Figs. 5 and 6. The lattice-work, being adjustable, is opened and closed at pleasure by the movement of a lever, H, to secure any degree of friction required at this portion of the apparatus.

The upright pipes F are of rectangular form, and each is divided into several compartments by vertically-arranged corrugated plates I. These plates are preferably held in their places by small projections or brackets cast on the inside of the pipes F. The plates I should, furthermore, be provided in successive series, one series above another, with the plates of one series over the spaces between the plates of that below, as shown in Fig. 1. The pipes F are arranged in pairs, connected at top by the caps J, which caps are corrugated internally to exert frictional action upon the gas passing in contact therewith, and are placed with their lower edges in cups K, furnished upon the upper portions of the pipes, and filled with water to lute the joints between the caps and the tops of the pipes. The caps may be held in position by a strap-hinge and a suitably-arranged fastening-pin, and may be readily taken off, when necessary, to permit the removal of obstructions from within.

The gas, after passing through the lattice-work G, is divided into separate volumes by the corrugated plates I, and subjected to friction by contact with the said plates, and, rising to the top of the one pipe F, is conducted across to the opposite pipe F by the connecting-cover J, where, as previously explained, further friction is applied; then downward to the tar-well D. It then moves forward on this same side until it comes in contact with a second plate, E, which causes it to enter at the bottom of the pipe F next adjacent, and through the lattice-work G, and between the corrugated plates I, to the next cover J, by which it is brought to the opposite pipe F, from which it descends to the tar-well D, and so on alternately until it passes through the entire condenser into the outlet-main L.

As concerns the lattice-work G, it is secured to a frame-work, *b*, which is bolted to a bonnet, *d*, and slides into the pipes F upon projections, or in grooves provided internally upon the pipes, and is further supported upon a horizontal reversing-bar, *h*, which projects through the stuffing-box *e*, so as to receive the handle H, by which the lattice-work is moved to the position required to secure the necessary degree of friction upon any given volume of gas passing through. The extent of the required movement may be regulated by the graduated arc *f* upon the bonnet *d*, and determined by the pressure-gages M, attached to the inlet and outlet of the condenser. The lattice-work G may be constructed with two tiers of slats. The inner end of the horizontal bar *h* is provided with a double arm, *i*, which engages with the upper and lower tiers by means of parallel bars *c*, secured to pins that rotate the slats of the lattice-work. The lattice-work, being secured to the frame-work *b*, which is bolted to the bonnet *d*, fastened by tap-bolts to the vertical pipes F, is rendered easy of removal for repairs by opening the valve O and shutting off the gas from the condenser by the valves N, and passing the gas through the by-pass P, as indicated more fully in Fig. 3. The slats are provided at their ends with journals or pins, which work in loose sockets, so that the slats may be moved by the parallel bars, as previously herein described. The bases of the pipes F are enlarged in proportion to the room occupied by the lattice-work G, so that the proper areas for the passage of the gas are maintained.

Constructed and operating substantially as set forth, the apparatus may be used for the treatment, in any given time, of any required volume of gas—say, from fifty thousand to five million cubic feet per day—and, without the use of water, will arrest all the tar existing in the gas as it comes from the hydraulic main, and send forward the gas from the apparatus in better condition than is found practicable by any previously known method, all its volatile and light hydrocarbons being retained to increase its quantity and add to its illuminating power.

What we claim as our invention is—

1. The combination, with a condenser, of a hydraulic seal arranged to act upon the volume of gas passing to or through the condenser, substantially as and for the purpose set forth.

2. The combination, with the condenser, of the adjustable lattice-work, substantially as and for the purpose set forth.

3. The combination, with the condenser, of the corrugated plates I, substantially as and for the purpose set forth.

4. The combination, with the pipes F of the condenser, of the corrugated caps J, substantially as and for the purpose set forth.

WM. H. ST. JOHN.
S. O. ROCKWELL.

Witnesses:
BURR WAKEMAN,
THOS. E. CUFF.